United States Patent
Holopainen et al.

(10) Patent No.: US 6,679,819 B1
(45) Date of Patent: Jan. 20, 2004

(54) SLIDE SHOE ASSEMBLY FOR A ROLL IN A PAPER/BOARD MACHINE OF A FINISHING MACHINE

(75) Inventors: Kari Holopainen, Muurame (FI); Pekka Kivioja, Muurame (FI); Jorma Snellman, Jyväskylä (FI); Aki Mikkola, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/806,019

(22) PCT Filed: Sep. 24, 1999

(86) PCT No.: PCT/FI99/00786
§ 371 (c)(1),
(2), (4) Date: Sep. 10, 2001

(87) PCT Pub. No.: WO00/17531
PCT Pub. Date: Mar. 30, 2000

(30) Foreign Application Priority Data

| | | |
|---|---|---|
| Sep. 24, 1998 | (FI) | 982050 |
| Sep. 24, 1998 | (FI) | 982051 |
| Sep. 24, 1998 | (FI) | 982054 |

(51) Int. Cl.[7] .................................................. B23P 15/00
(52) U.S. Cl. ........................... 492/16; 492/7; 492/20
(58) Field of Search ............................ 492/7, 6, 2, 16, 492/20; 162/358.1, 358.3; 384/121, 122, 123

(56) References Cited

U.S. PATENT DOCUMENTS

| 4,581,797 | A | * | 4/1986 | Lehmann ................. 100/162 B |
| 5,286,245 | A | * | 2/1994 | Schiel ........................ 492/10 |
| 5,797,826 | A | * | 8/1998 | Deshpande et al. ...... 162/358.3 |
| 5,967,957 | A | * | 10/1999 | Kusters ........................ 492/7 |

* cited by examiner

Primary Examiner—I Cuda Rosenbaum
(74) Attorney, Agent, or Firm—Steinberg & Raskin, P.C.

(57) ABSTRACT

The invention relates to a slide shoe assembly for a roll (1) in a paper/board machine or a finishing machine, said roll (1) comprising a stationary axle (4), around which is rotatably mounted a cylindrical roll shell (2), a clearance (5) formed between the axle (4) and an inner surface (3) oF the roll shell (2) being fitted with loading elements (11) operated by a pressurized hydraulic fluid and provided with slide shoes (10, 110) which are loadable against the inner surface (3) of the roll shell (2) for controlling the distribution of a nip pressure in a nip (N) established with a counter roll (9). According to the invention, the loading element is equipped with means capable of eliminating or compensating for a nip-load induced deflection of the roll shell and/or a deflection of the slide shoe caused by the pressure of a hydraulic medium, thereby eliminating the harmful effects caused by said deflections on an oil film between the loading shoe and a cylindrical surface supported thereby.

20 Claims, 11 Drawing Sheets

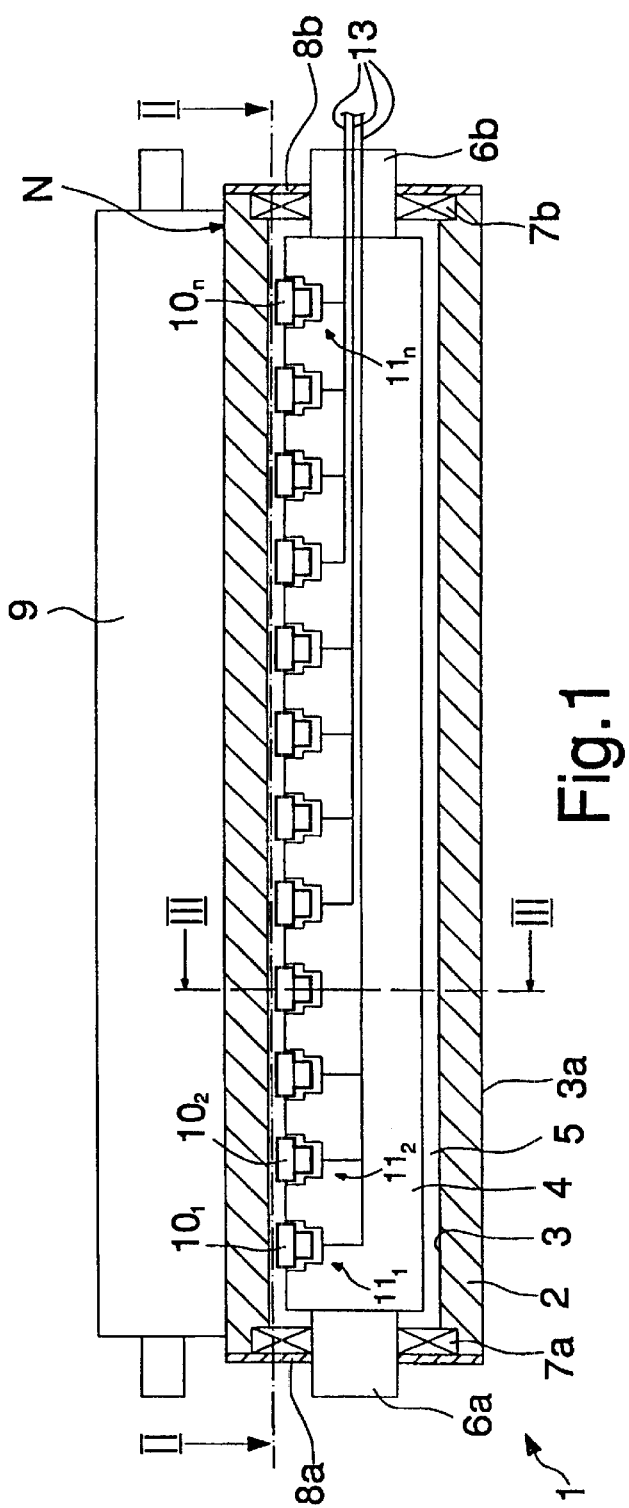
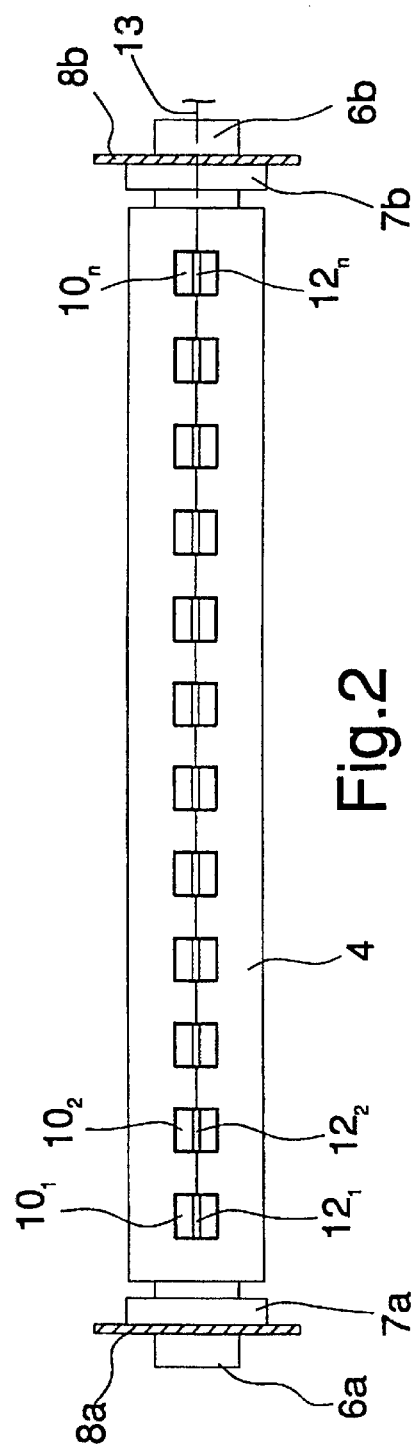
Fig.1
Fig.2

SLIDE SHOE ASSEMBLY FOR A ROLL IN A PAPER/BOARD MACHINE OF A FINISHING MACHINE

BACKGROUND OF THE INVENTION

Field of the Invention

The present invention relates to a slide shoe assembly for a roll in a paper/board machine or a finishing machine, said roll comprising a non-rotating or stationary axle. Around the axle is rotatably mounted a cylindrical roll shell, a clearance formed between its inner surface and said axle being fitted with loading elements operated by a pressurized hydraulic fluid. The loading elements include slide shoes loadable against the inner surface of the roll shell for controlling the distribution of a nip pressure in a nip established with a counter roll.

The invention relates further to a loading shoe for a thin-shelled deflection-compensated roll in a paperboard machine or a finishing machine, said roll comprising a massive stationary roll axle and a thin-walled roll shell mounted rotatably around the roll axle, said loading shoe being fitted in a loading chamber formed along the roll axle and being loadable by means of a hydraulic medium present in the loading chamber towards the inner surface of the shell for bringing the sliding surface of the shoe against the inner surface of the shell, and said deflection-compensated roll establishing a nip with a counter roll.

The invention relates also to a slide shoe assembly for slide bearing of a roll in a paper/board machine or a finishing machine, said assembly comprising a hydrostatic loading shoe, including a piston element fitted in a cylinder boring, as well as a curvilinear slide shoe attached to or integrally included in the outer crown of the piston element and provided with bearing pockets, whereby, by delivering a pressure medium into the cylinder boring below the piston element, the slide shoe is adapted, as a result of a pressure produced by the pressure medium, to bear, through the intermediary of an oil film produced by a lubricating oil delivered into the bearing pockets, against a rotating roll axle to be fitted with a bearing.

The invention relates still further to a hydrostatic loading shoe for a roll in a paper machine, said hydrostatic loading shoe comprising a piston element fitted in a cylinder boring, as well as a curvilinear slide shoe attached to or integrally included in the outer crown of the piston element and provided with bearing pockets, whereby, by delivering a pressure medium into the cylinder boring below the piston element, the slide shoe is adapted, as a result of a pressure Hi produced by the pressure medium, to bear, through the intermediary of an oil film produced by a lubricating oil delivered into the bearing pockets, against a rotating cylindrical surface to be fitted with a bearing.

BACKGROUND OF THE INVENTION

The use of thin-walled shells, having a shell thickness, e.g. within the range of about 30 to about 60 mm, in deflection-compensated rolls is beneficial, regarding, e.g. the adjustability of the crosswise characteristic profile of a paper web. One problem in such thin-walled shells is an inward deformation of the shell at the nip, which is caused by a nip load and results at the nip in the thinning and even breakdown of a lubricating film between the shell and the loading shoe. In order to overcome this problem as far as a zone- regulated roll is concerned, has proposed a slide shoe assembly, wherein the solid walls of chambers present in the slide shoes are replaced with elastic walls adapting automatically to a deformation of the shell. However, this solution is relatively complicated and expensive.

In the deflection-compensated rolls of a paper machine, the roll shell is normally mounted rotatably on a stationary roll axle in such a way that the roll axle is provided with cylinder borings or the like, which are fitted with pressure-fluid chargeable hydraulic loading elements, used for loading the roll shell usually in the direction of a nip plane, These hydraulic loading elements or loading shoes comprise a piston element fitted in a normal fashion in a cylinder boring present in the roll axle, as well as a slide shoe present at the outer crown of the piston element and bearing against the inner surface of the roll shell. The loading shoe, and particularly its piston element, is often designed in such a way that the piston element itself is cup-shaped and includes a cavity exposed to the action of the pressure of a pressure fluid for loading the slide shoe against the inner surface of the roll shell. It has been a particular problem with loading shoes of this type that the loading pressure existing underneath the shoe tends to lift the slide shoe upward over its mid-section as opposed to its edge zones. Hence, the slide shoe deflects, whereby the contour of its outer surface may become unfavourable relative to the curvature of the inner surface of a roll shell, leading to faults in the operation of a slide shoe and particularly to excessive oil leak through between the slide shoe and the roll shell. At present, attempts have been made to overcome this deflection problem by increasing the thickness of a slide shoe, thus increasing its rigidity along with its thickness. Naturally, this has also increased the mass of a shoe.

Nowadays, the journalling of rolls in paper machines is more and more often carried out by using slide bearings instead of ordinary roller bearings. This is because slide bearings are largely capable of avoiding the problems and restrictions involved in roller bearings. Such hydrostatic slide bearings are equipped with curvilinear slide shoes, which position themselves around the neck of a roll axle for mounting the axle rotatably relative to a bearing block. The slide shoe is secured to a piston element fitted in a cylinder present in the bearing block, the slide shoe being loaded against a journal by supplying a pressure fluid into said cylinder below the piston element. These slide bearings involve a problem similar to what is found in the loading shoes of deflection-compensated rolls, i.e. deflection of the sliding element or sliding surface of a slide bearing. This deflection, or a change in the curvature of a shoe under a pressure load, can be highly detrimental in view of the performance of a bearing At worst, the deflection of a shoe is so significant that, as a result of this deflection no sufficient oil film can be established between the slide shoe and the journal, resulting naturally in a damaged bearing. Earlier attempts have been made to eliminate this problem in such a way that the rigidity of a slide shoe has been increased in a manner similar to what is done in connection with the loading shoes of deflection-compensated rolls.

OBJECTS AND SUMMARY OF THE INVENTION

It is one object of the invention to provide a slide shoe assembly of the above-mentioned type, whereby it is possible to prevent as well as possible the thinning or, in the worst case, the breakdown of an oil film resulting from the deflection of a roll shell.

It is a second object of the present invention to provide an improved loading shoe and a method for eliminating the nip-load induced deformations of a thin-walled deflection-compensated shell in a comparatively simple manner which is applicable in connection of both individually adjustable and zonewise adjustable loading shoes.

It is yet another object of the present invention to provide such a loading shoe, especially a loading shoe fit for supporting the roll shell of a deflection-compensated roll or for fitting a roll with a slide-bearing, wherein changes in the curvature of the shoe under a pressure load are minimized.

According to a first aspect of the invention, a slide shoe assembly for a roll in a paper/board machine or a finishing machine is principally characterized in that the loading element is equipped with means capable of eliminating or compensating for a nip-load induced deflection of the roll shell and/or a deflection of the slide shoe caused by the pressure of a hydraulic fluid, thereby eliminating the harmful effects caused by said deflections on an oil film between the loading shoe and a cylindrical surface supported thereby.

A slide shoe assembly according to another aspect of the invention is characterized in that the unpressurized space comprises a lengthwise slot, extending longitudinally of the roll between opposite sides of the slide shoe and opening at both ends thereof into said clearance.

According to yet another aspect of the invention, a loading shoe for a thin-shelled deflection-compensated roll in a paper/board machine or a finishing machine is characterized there are two or more stabilizing chambers in axial succession on either side of the high-pressure chamber.

According to still another aspect of the invention, a hydrostatic loading shoe for a roll in a paper machine is characterized in that the void space below the slide shoe is established by means of a shaped piece secured to a bottom of the piston-element cavity. The invention according to this aspect is capable of offering certain benefits over the currently available solutions, including as follows. The invention can be exploited for reducing material thicknesses in a shoe and, respectively, for increasing the pressure level of a shoe. Particularly in deflection-compensated rolls, this results in a major advantage in the sense that the possibility of increasing the pressure level has a consequence of increasing the adjustment range of a linear load achievable by the shoes. Respectively, in connection with slide bearing, the height of loading shoes can be reduced, one result of which is, e.g. that the size of bearing assemblies can be reduced. Other benefits and characterizing features of the invention are described in the subsequent detailed specification of the invention.

BRIEF DESCRIPTION OF THE DRAWINGS

The invention will be described hereinbelow with reference to a few preferred embodiments of the invention depicted in the accompanying drawings, wherein FIG. 1 shows schematically a slide shoe assembly according to one embodiment of the invention for a thin-shelled deflection-compensated roll.

FIG. 2 shows a section II—II of FIG. 1.

DETAILED DESCRIPTION OF THE INVENTION

Figure 3A:
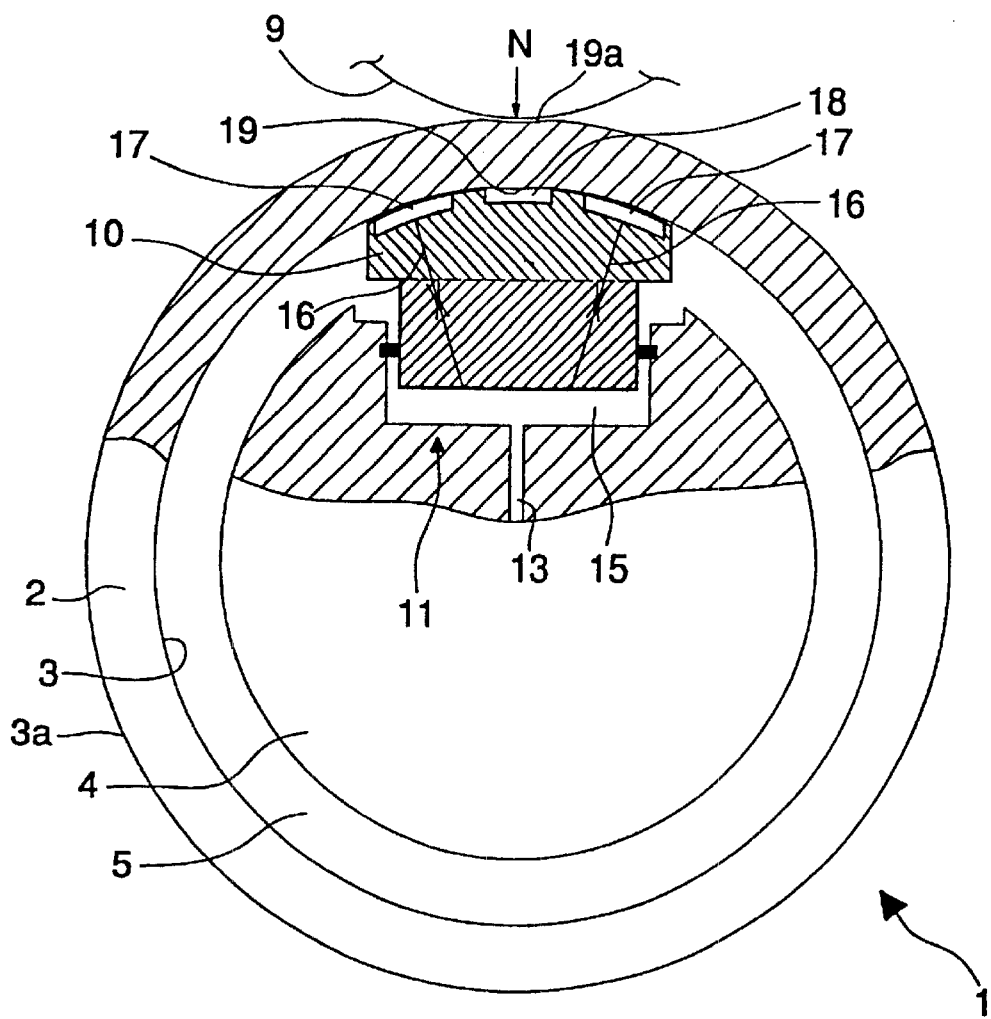
FIG. 3A shows in an enlarged scale a more detailed section III—III of FIG. 1.

Referring to FIG. 1, there is shown a general construction for a thin-shelled deflection-compensated roll 1, which is previously known as far as its main components are concerned. The roll 1 comprises a non-rotating or stationary axle 4, around which a cylindrical roll shell 2 is rotatably mounted. The roll shell 2 is journalled with bearings 7a, 7b on axle journals 6a, 6b constituting an extension to each end of the axle 4, with a clearance 5 remaining between the roll shell 2 and the axle 4. By way of example, the cylindrical roll shell 2 has its open ends sealed with end, flanges 8a, 8b. The roll 1 is driven by a drive mechanism, not shown.

Figure 3B:
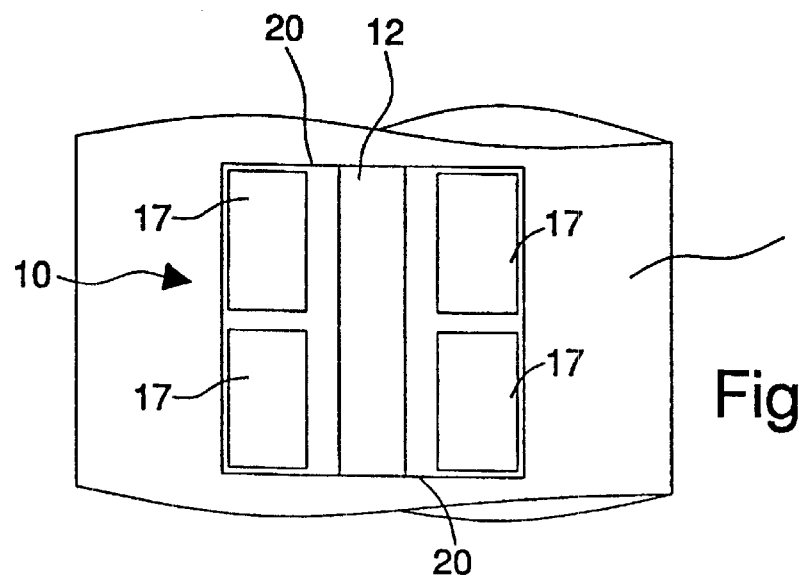
FIG. 3B shows a slide shoe according to the embodiment of FIG. 3A in a plan view.

FIGS. 2, 3A and 3B illustrate one slide shoe assembly of the invention. FIG. 3A depicts in an enlarged scale a section III—III in FIG. 1. The roll 1 constitutes a press nip N together with a counter roll 9. Between an inner surface 3 of the roll shell 2 and the axle 4 is fitted a slide shoe 10, which comprises loading elements 11. The nip N has a nip pressure which is adjustable by the loading elements 11, as cylinders 15 of the loading elements 11 are supplied with an appropriate adjustable pressure from an external pressure source (not shown) by means of a hydraulic fluid through oil ducts 13. The same hydraulic fluid can be carried through lubrication ducts 16 present in the loading elements 11 into stabilizing chambers 17 and further to constitute a lubrication film between the sliding surfaces of the slide shoes 10 and the inner surface 3 of the roll shell 2.

In the slide shoe assembly of the invention, each slide shoe 10 is provided adjacent to the nip N with an unpressurized space 18, which affords the roll shell 2 a free inward deflection 19, 19a as a result of the nip pressure.

Between the circumferentially successive stabilizing chambers 17 of each slide shoe 10 in line with the nip N is provided an elongated slot 12 parallel to the roll 1. The slot 12 is extending between opposite sides 20 of the slide shoe and opens at both ends thereof into said clearance 5. Thus, the unpressurized space 18 develops within a zone defined by the walls of this slot 12 and the inner surface 3 of the roll shelf 2. Minor leaks of the lubricating film or the stabilizing chamber 17 are not harmful as the surplus hydraulic fluid exits through the open ends of the slot 12 into the clearance 5.

As best shown in FIG. 3A, the unpressurized space 18 allows; particularly the free inward deflection 19 for the inner surface of the roll shell 2, whereby the lubricating film between the inner surface 3 of the roll shell 2 and the slide shoe 10 retains a substantially equal thickness over the entire sliding surface of the slide shoe 10.

Figure 4:
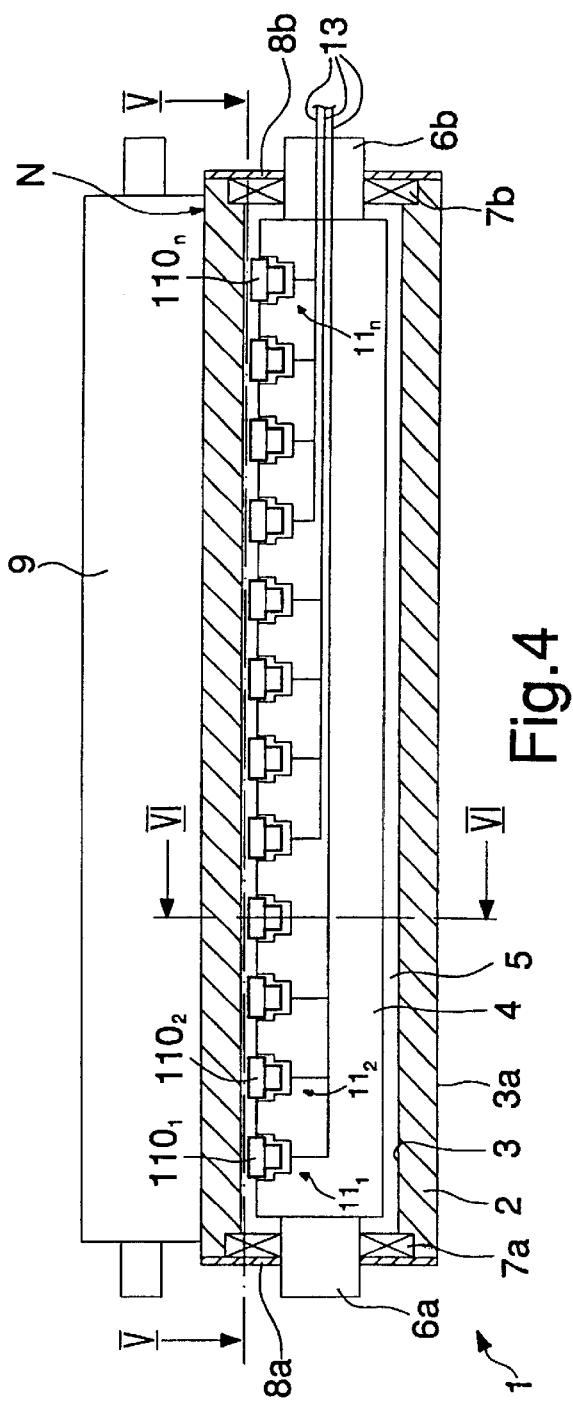
FIG. 4 shows schematically a slide shoe assembly according to a second embodiment of the invention for a thin-shelled deflection-compensated roll.
Figure 5:
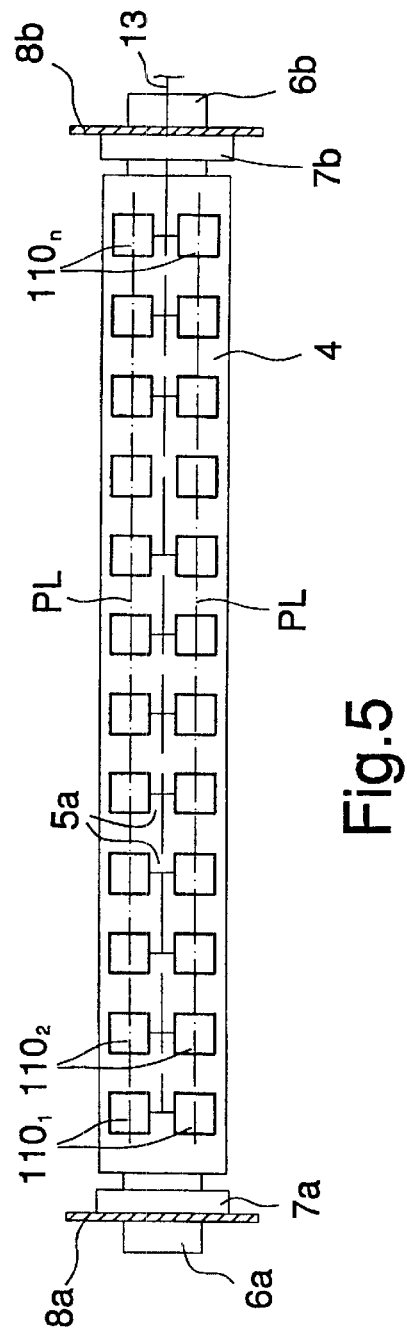
FIG. 5 shows a section V—V of FIG. 4.
Figure 6:
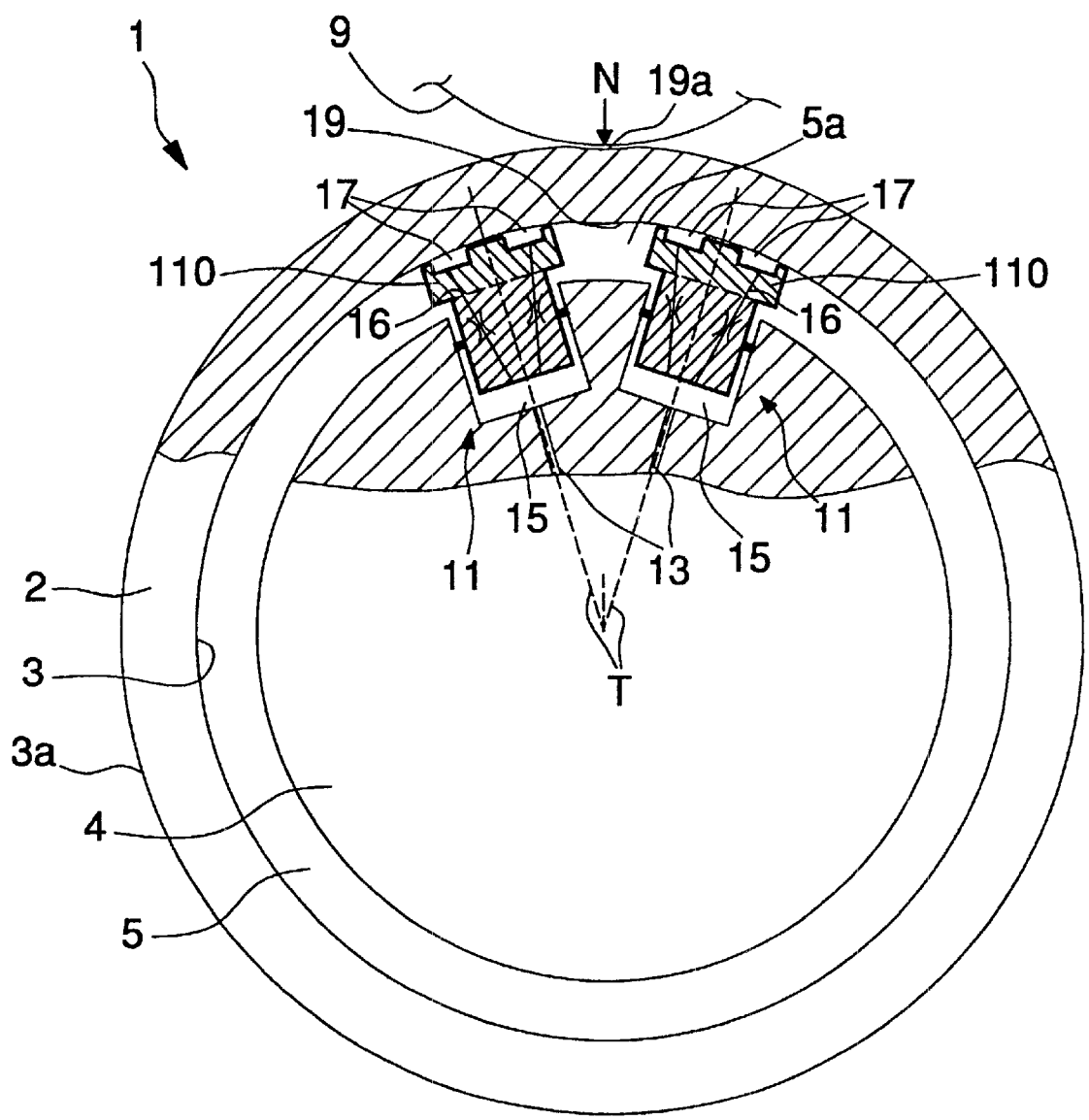
FIG. 6 shows in an enlarged scale a more detailed section VI—VI of FIG. 4.

FIGS. 4, 5 and 6 illustrate a second preferred embodiment for a slide shoe assembly in a thin-shelled deflection-compensated roll. In relation to other, above-described embodiments, the difference is that the loading elements 11 are arranged in two main loading lines PL (see FIG. 5), extending lengthwise of the roll 1. The loading elements 11 are provided with slide shoes 110 similar to prior art slide shoes in terms of design and function.

As best shown in FIG. 6, the two divergent main loading lines PL have their planes T set on either side of the nip N spaced from each other along the circumference of the axle 4. Thus, said unpressurized space Sa develops preferably between the opposite slide shoes 110 of two main loading lines PL in line with the nip N and in communication with the clearance 5. Hence, the unpressurized space 5a allows for the inner surface 3 of the roll shell 2 a free deflection 19 toward the axle 4. The lubricating film remains over the sliding surfaces of the entire slide shoe 110 in a substantially equal thickness, as the main loading lines PL are offset in the peripheral direction of the axle from the nip N and, hence, the deflection 19.

Figure 7:
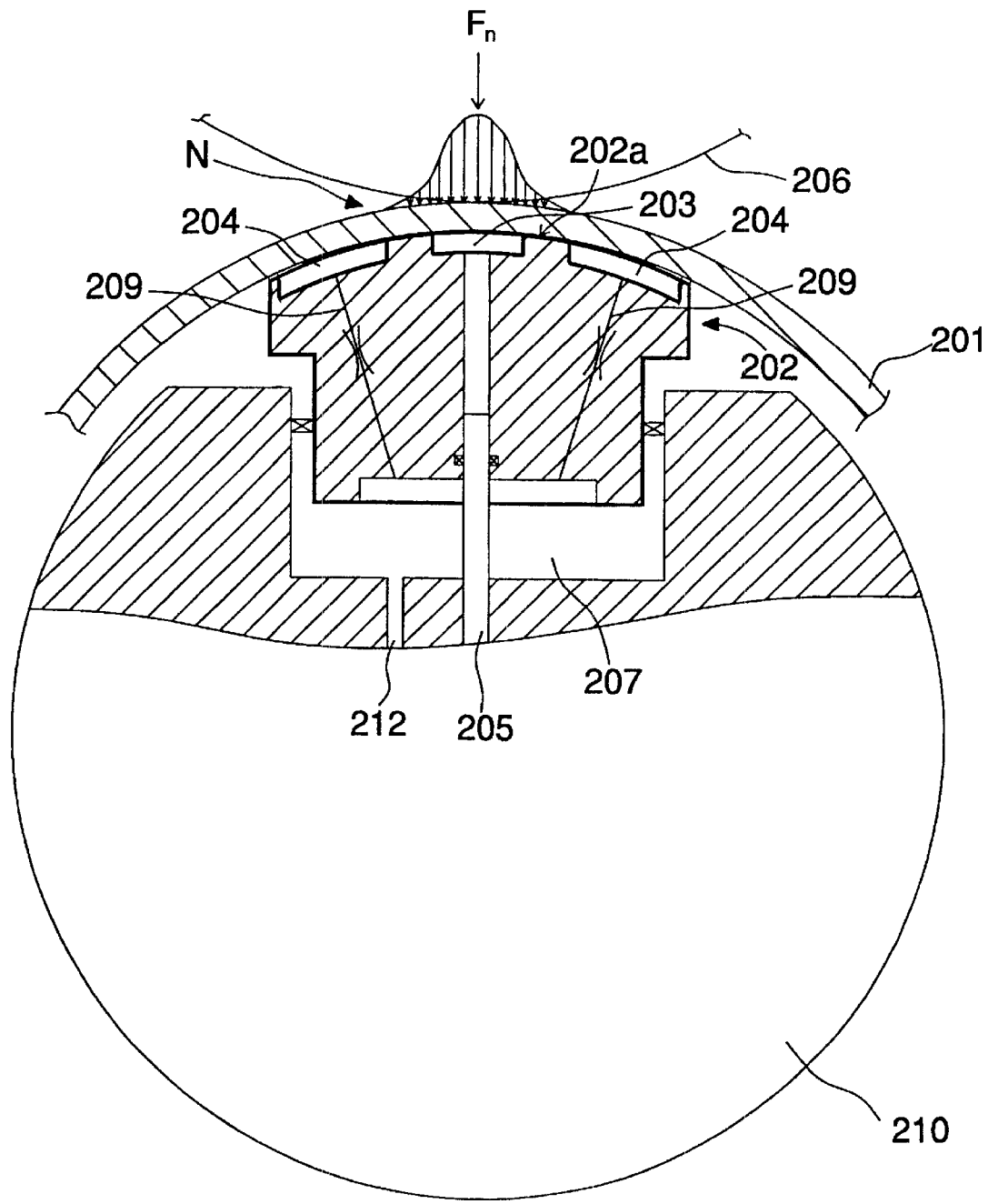
FIG. 7 shows one schematic exemplary embodiment for a loading shoe of the invention in a cross-section.

The deflection-compensated roll of FIG. 7 comprises a thin-walled shell 201 mounted rotatably around a stationary massive axle 210, which together with the outer surface of a counter roll 206 builds a nip N, wherein a nip force $F_N$ endeavours to cause deformations or strains in the shell 201 in its radial direction. The stationary axle 210 is provided with a loading chamber 207 supplied with a hydraulic medium through a passage 212. This loading chamber 207 is equipped with a loading shoe 202 in such a way that its sliding surface 202a is directed towards the inner surface of the shell 201. By using the pressure of a hydraulic medium existing within the loading chamber 207 the shoe 202 is loadable towards the inner surface of the shell 201 for bringing the sliding surface of the shoe into contact with the discussed inner surface, with a film of lubricating oil positioned between said opposed surfaces. In line with the nip N, the loading shoe has its sliding surface provided with a high-pressure chamber 203 supplied through a passage 205 with a high-pressure hydraulic medium. On either side of this high-pressure chamber 203 circumferentially of the shell 201 there are stabilizing chambers 204, which are supplied with a hydraulic medium from the loading chamber 207 at a low-pressure. The function of these stabilizing chambers 204 is to maintain the shoe in a true position during the rotating motion of the shell 201. There may be two or more axially successive stabilizing chambers on either side of the chamber 203; in the embodiment of FIG. 7, the total number of stabilizing chambers is four.

By delivering a high-pressure hydraulic medium into the high-pressure chamber 203, substantially all of the radially directed deformations caused in the shell by the nip force F can be eliminated, thus preventing the thinning of a lubricating oil film between the sliding surface of a loading shoe and the inner surface of a shell, as well as problems resulting therefrom. This type of solution enables the advantageous use of thin-walled shells in terms of the adjustability of the crosswise characteristic profile of a material web to be treated.

Figure 8:
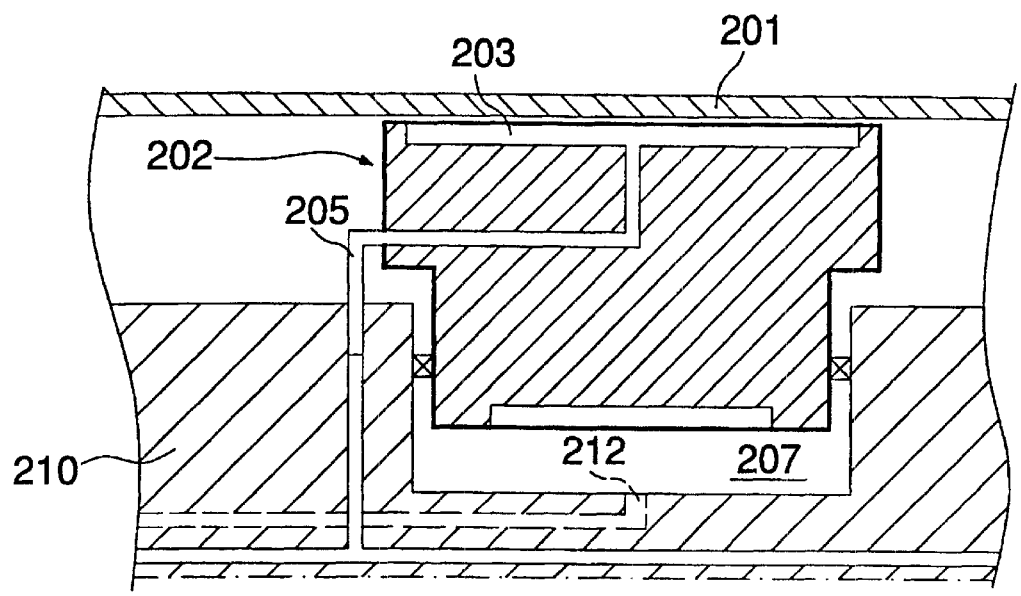
FIG. 8 shows a second schematic exemplary embodiment for a loading shoe of the invention in a longitudinal section.
Figure 9:
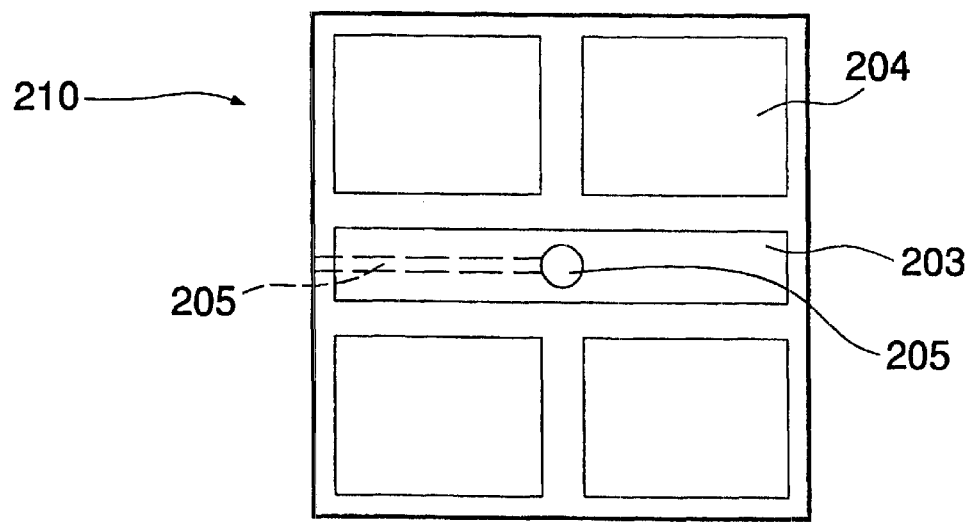
FIG. 9 shows the embodiment of FIG. 8 in a plan view.

The embodiment of FIGS. 8 and 9 differs from that of FIG. 7 only in terms of the disposition of passages 205 and 212. In this embodiment, the passage 205 is preferably constructed by using a tube in a section between the axle 210 and the shoe 202.

Figure 10:
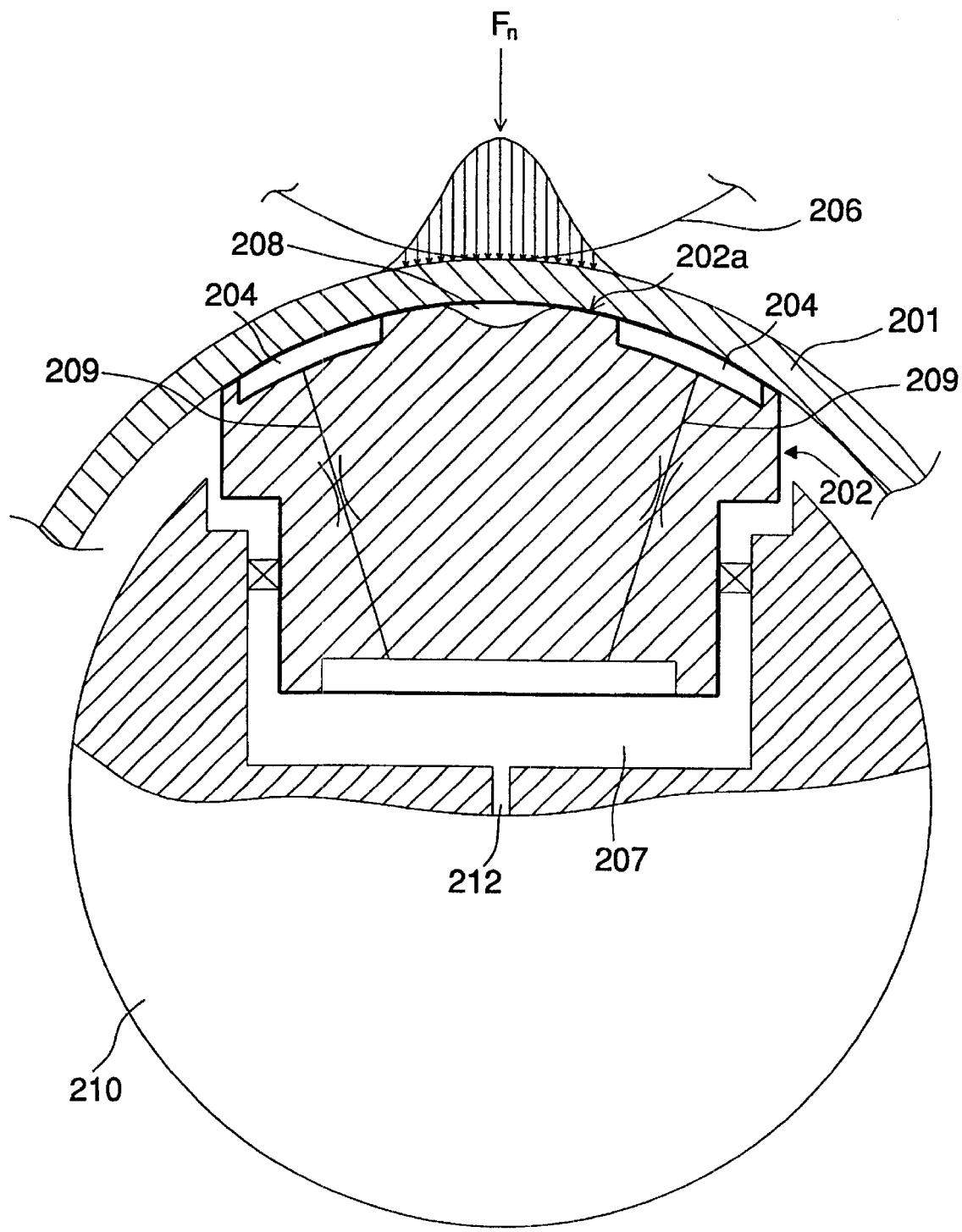
FIG. 10 shows yet another schematic exemplary embodiment for a loading shoe of the invention in a cross-section.

The embodiment of FIG. 10 differs from those of FIGS. 7–9 in the sense that, instead of a high-pressure chamber 203, the high-pressure space is established by means of a comparatively wide neck between the stabilizing chambers 204, which is provided with inwardly directed chamfers 208 for enhancing a pressure increase produced hydrodynamically on said neck by means of the rotating motion of the shell in order to develop a sufficiently high pressure for preventing the strains or deformations of the shell. The neck can also be provided with a feed for extra oil at a constant flow rate for enhancing a hydrodynamically produced pressure increase, without or in addition to said chamfers.

Figure 11:
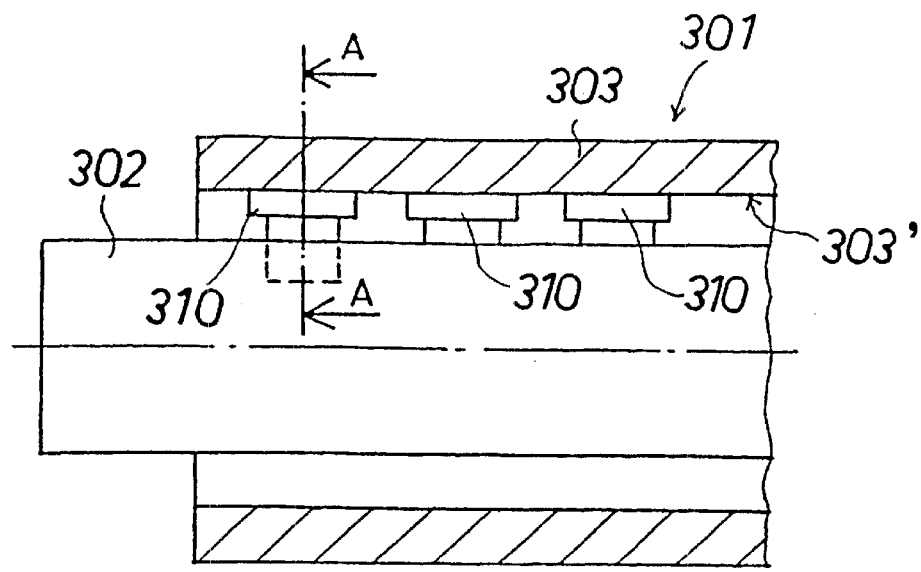
FIG. 11 shows a portion of a deflection-compensated roll in a completely schematic lengthwise cross-section.

FIG. 11 illustrates schematically and in a partially cut-away view a deflection-compensated roll, generally designated by reference numeral 301. The roll 301 comprises a non-rotating roll axle 302, on top of which is rotatably mounted a roll shell 303. The roll shell 303 and the roll axle 302 define therebetween a space which is fitted with hydraulic loading elements or hydrostatic loading shoes 310 functioning in a loading direction, especially in the direction of a nip plane, for providing a desired load on an inner surface 303' of the roll shell. In a normal fashion, the loading shoes include piston elements which are fitted in cylinder borings present in the roll axle 302.

Figure 12:
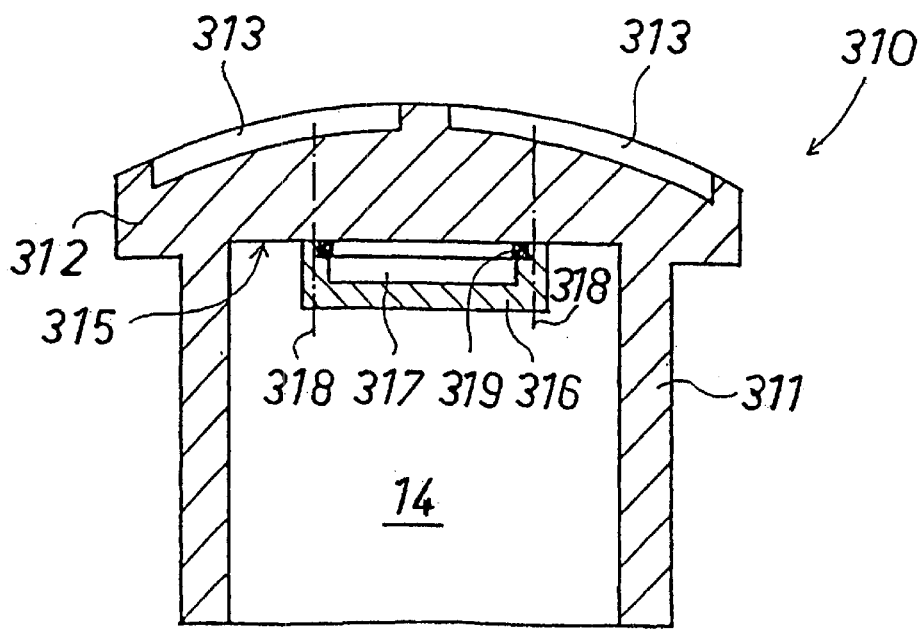
FIG. 12 is an enlarged sectional view along a line A—A of FIG. 11, depicting one roll-loading shoe in a section.

FIG. 12 shows in more detail a loading shoe 310 used in the roll of FIG. 11. The loading shoe 310 includes a slide shoe 312 as well as a piston element 311, which are depicted in the figure as a single piece, but which are more commonly made of separate elements and attached to each other e.g. with screw members. The piston element 311 is cup-shaped, comprising a cavity 14 which is subjected to the action of a hydraulic load pressure as the loading shoe 310 is set to bear against the inner surface 303' of the roll shell. The slide shoe 312 is in a normal fashion provided with bearing pockets 313 which are supplied with lubricating oil from the cavity 14 by way of capillary bores (not shown in loaded condition) for establishing a necessary oil film between the slide shoes 312 and the inner surface 303' of the roll shell. In the solution of the invention, the cavity has its bottom 315 fitted with a cup-like shaped piece 316, such that the shaped piece 316 has the rims of its "cup" set against the bottom 315 of the cavity. The shaped piece 316 is secured to the bottom 315 of the cavity by means of appropriate fasteners, for example screws 318, and furthermore, between the shaped piece 316 and the bottom 315 of the cavity is fitted a packing 319 for denying the pressure existing in the cavity 14 an access to a void, hollow space 317 between the shaped piece 316 and the bottom 315 of the cavity. Thus, the discussed space 317 maintains a standard atmospheric pressure.

Figure 13:
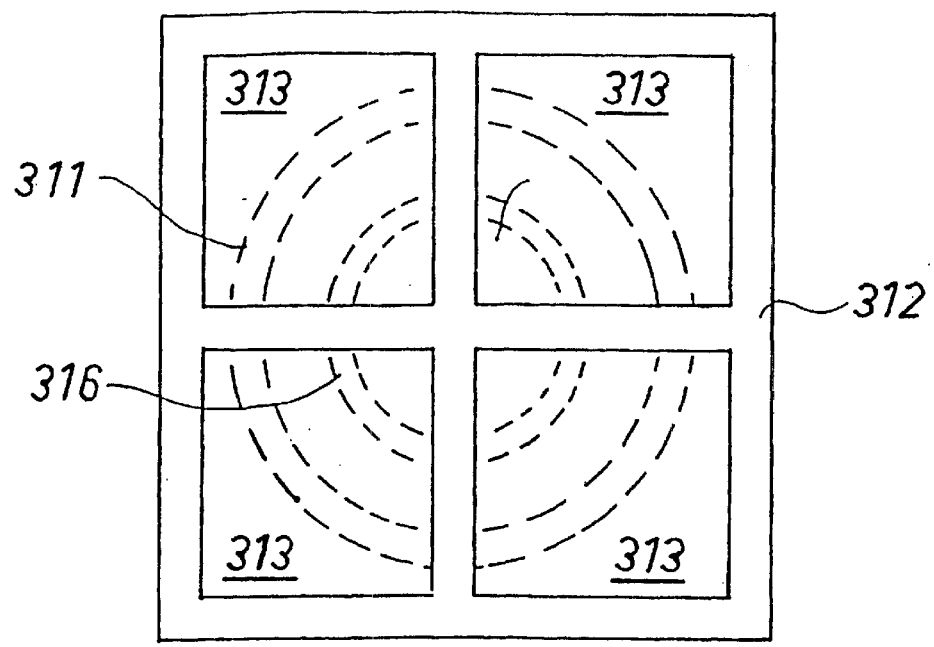
FIG. 13 shows schematically a loading shoe consistent with FIG. 12, as seen from the direction of a sliding surface or the direction of a roll shell.

Consequently, what is achieved by the solution of the invention is that the pressure prevailing in the cavity 14 is not allowed to have an effect on the bottom 315 of the cavity over its entire surface area. The pressure has an impact on the bottom 315 of the cavity solely from the area outside the shaped piece 316, which lies against the bottom 315 of the cavity. This solution makes it possible to avoid the deflection of a slide shoe 312 experienced in the prior art solutions and the rising of a slide shoe in its middle portion. Since the middle portion of the slide shoe 312 is not subjected to the action of pressure, said middle portion is in fact depressed. Thus, the rims of the slide shoe 312 do not become excessively loose from the inner surface 303' of the roll shell. FIG. 13 endeavours to illustrate this by showing in dashed lines the piston element 311 and the rim of the shaped piece 316. The area inside this rim, or the void space 3–17, cannot be reached by the pressure.

Figure 14:
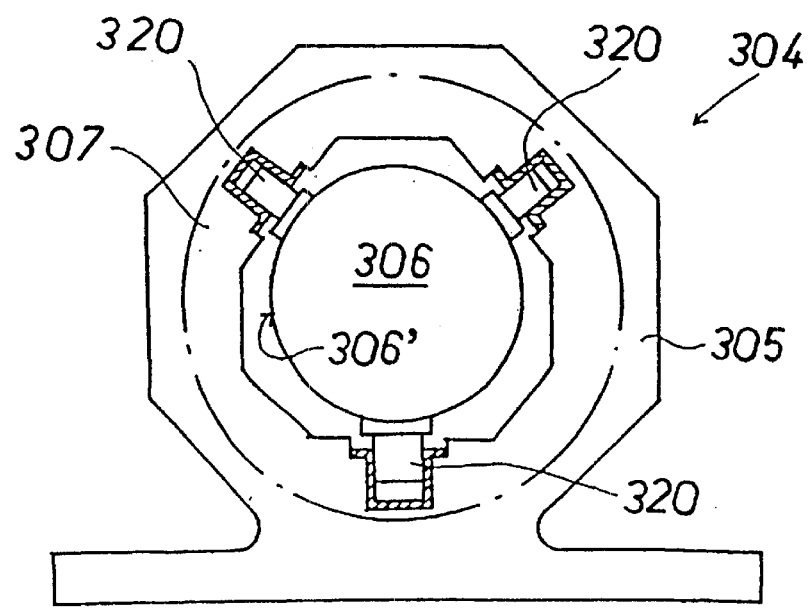
FIG. 14 is a completely schematic and partly cut-away side view, showing a slide bearing for one side of a roll fitted with slide bearings.

FIGS. 14–16B show an application of the solution of the invention to a loading shoe used in slide journalling. FIG. 14 depicts schematically a slide bearing at one end of a slide-journalled roll, which is designated generally by reference numeral 304. The slide bearing 304 comprises a bearing block 305, against which is supported, by means of loading shoes 320, a roll 307 by its axle 306. Thus, the loading shoes 320 brace themselves around a bearing journal provided on the axle 306 through the action of a hydraulic medium supplied underneath the loading shoes 320. As for its design, a loading shoe of the invention is examined in more detail in FIGS. 15 and 16. Although the slide bearing application is in this context explained by using just one embodiment of the invention as an example, wherein the means compensating for or eliminating the deflection of a shoe are indeed positioned below the slide shoe, it should be appreciated that it is equally plausible to apply embodiments in which said means are included in a slide shoe itself or positioned on its sliding surface or in the immediate vicinity of a slide shoe.

Figure 15:
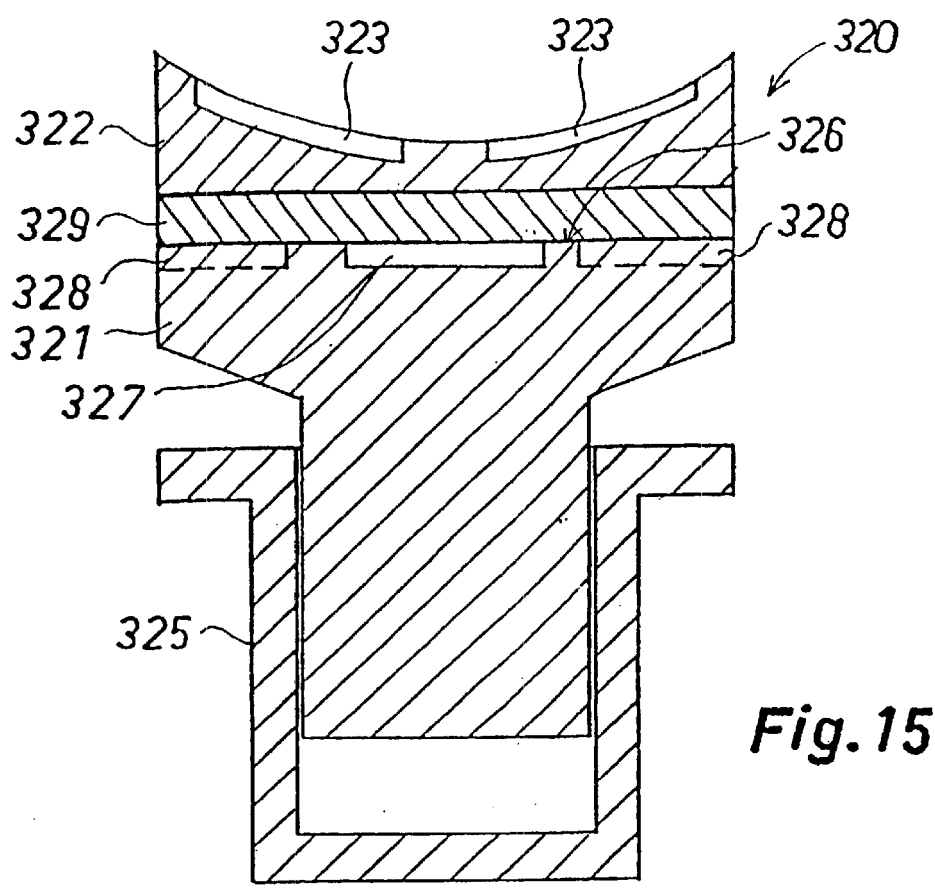
FIG. 15 shows schematically in a sectional view and in a larger scale one loading shoe for the slide bearing of FIG. 14.

The loading shoe 320 comprises a piston element 321, having its crown fitted with a slide shoe or a similar slide element 322, for example by means of a screw connection or the like. Hence, the slide shoe 322 functions as a bearing element and its material is for example bronze. The piston element 321 can be made of steel, cast iron, or some other material like that. The piston element 321 is fitted in a cylinder 325 mounted on the bearing block 305, whereby a pressure medium is supplied into a pressure chamber 324 below the piston element 321 for setting the slide shoe 322 to bear against a bearing journal provided on the axle 306. The slide shoe :322 is provided with bearing pockets 323, opening towards the axle 306 and being supplied from the pressure chamber 324 with necessary lubricating oil by way of capillary bores (not shown) extending through the piston element 321 and the slide shoe 322. The lubricating oil present in the bearing pockets 323 builds a necessary oil film between the slide shoe 322 and the axle 306. Since, as a result of the material being used, the slide shoe 322 has a rigidity which is substantially less than that of the piston element 321, FIG. 15 shows an embodiment in which a brace element 329 is fitted between the slide shoe 322 and the piston element 321 for bracing the slide shoe 322. In view of the solution, regarding performance, the use of a brace element 329 is not absolutely necessary, but, instead, the slide shoe 322 can also be secured directly to the crown of the piston element 321.

Figure 16A:
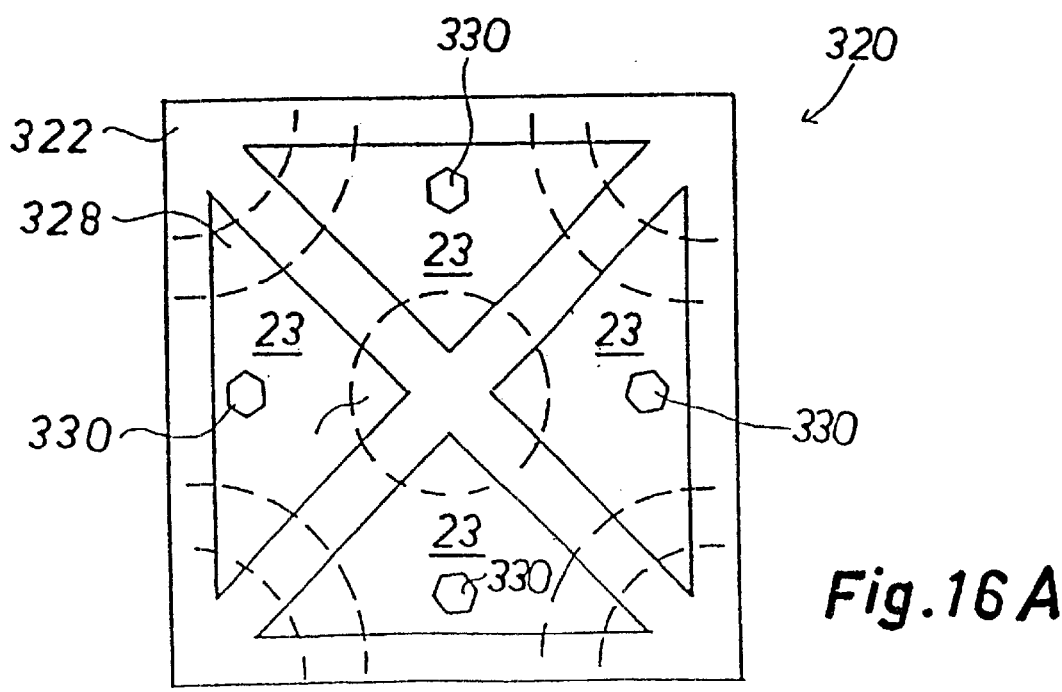
FIG. 16A shows a loading shoe consistent with FIG. 15, as seen from the direction of a sliding surface or the direction of a journal.
Figure 16:
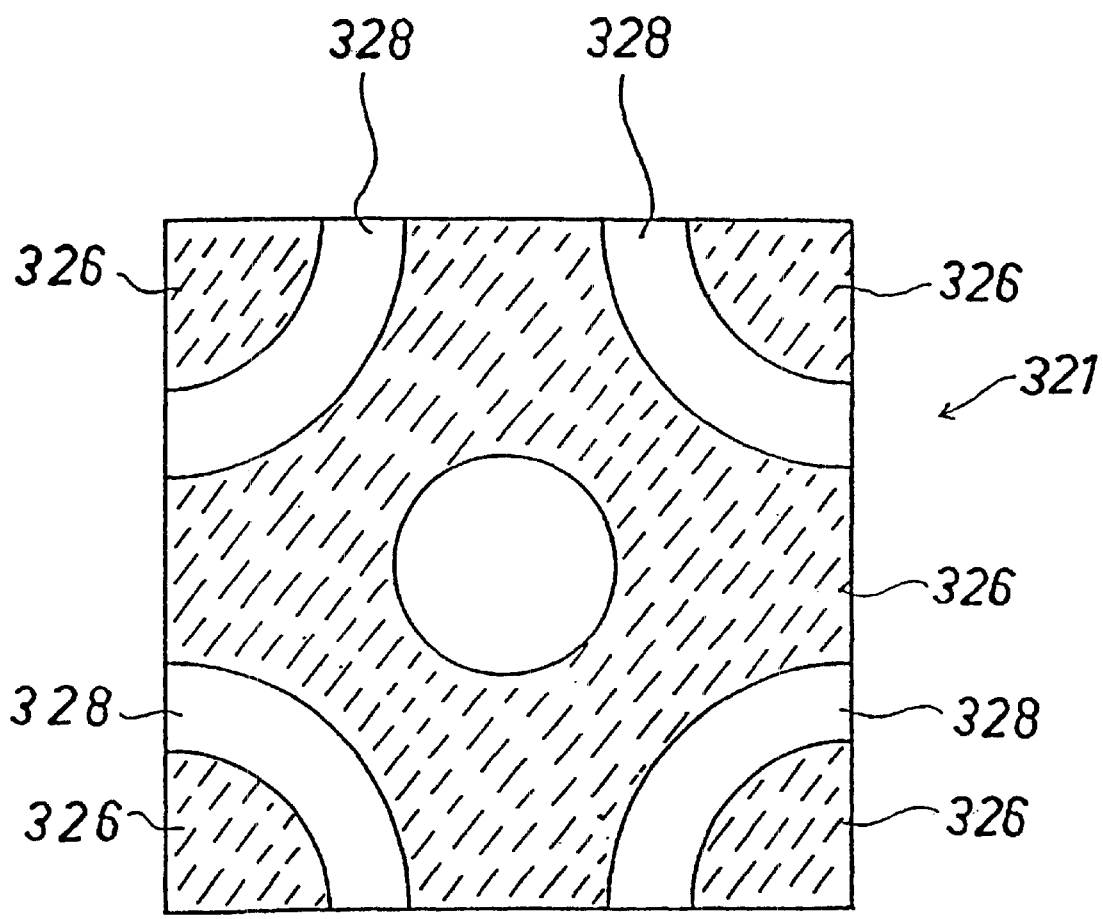
FIG. 16B shows a piston element for the loading shoe of FIG. 15, as seen from the direction of a slide shoe.

In the assembly according to the invention, the harmful deformations of the slide shoe 322 have been eliminated in such a way that the connection between the slide shoe 322 and the piston element 321, or, as in the embodiment of FIG. 15, in fact the connection between the brace element 329 and the piston element 321, are provided with appropriately shaped bearing surfaces 326 preferably in the piston element 321, said bearing surfaces 326 having areas 327, 328 between and outside themselves not in contact with the slide shoe 322 or, as in the embodiment of FIG. 15, with the brace element 329. These areas 327, 328 between and outside the bearing surfaces 326 are produced by machining the crown 305 of the piston element 321 for appropriate recesses. A more detailed view of this is attempted to give in FIG. 16A, which depicts the piston element 321 as seen from the direction of the slide shoe 322 and the axle 306. In FIG. 16B, the bearing surfaces 326 are illustrated by shaded areas, while the recesses 327, 328 between and outside the bearing surfaces are indicated by unshaded areas. Thus, the assembly of the invention achieves the fact that the slide shoe 322 is not able to deflect over the regions in line with the bearing surfaces 326, while the deflection is possible at the recesses 327, 328. Consequently, an appropriate design and selection of the bearing surfaces 326 can be used for minimizing deflections of the slide shoe 322 and, most importantly, for deflecting the slide shoe 322 as desired. Hence, the bearing element can be made secure and reliable in terms of its operation.

The invention has been described above by way of example, with reference made to the examples shown in the accompanying drawing figures. However, the invention is not limited exclusively to the examples depicted in the figures, as there are a plurality of options for implementing the invention which may vary within the scope of the inventive concept defined in the claims.

For example, the embodiments shown above in connection with FIGS. 1–10 only as an application for a roll-shell loading shoe are conceived to be suitable as such, or with minor modifications, also for use in connection with slide bearing for preventing the deflection of slide shoes, as well as the harmful impacts resulting therefrom on a film of oil between the slide shoe and the roll axle.

The present invention has been described herein with reference to preferred embodiments of the invention however the description provided herein is for illustrative purposes and should not be considered to be exhaustive. It is understood that modifications and variations of the above describe preferred embodiments are possible without departing from the spirit or scope of the present invention.

What is claimed is:

1. A roll in a paper/board machine or a finishing machine, said roll comprising:

a stationary axle;

a cylindrical roll shell rotatable mounted on said stationary axle, said cylindrical roll shell being structured and arranged such that clearance space is defined between said stationary axle and an inner surface of the roll shell;

a loading element operated by hydraulic fluid, said loading element including a slide shoe structured and arranged to place a load against said inner surface of the roll shell to thereby control the distribution of a nip pressure at a nip defined between said roll shell and a counter roll in said paper/board machine or finishing machine;

wherein said loading element comprises first and second stabilizing chambers, each one of said stabilizing chambers being located on either side of said nip, and means for eliminating at least one of a nip-load induced deflection of the roll shell and a deflection of the roll shell caused by said hydraulic fluid;

wherein said means for eliminating at least one of a nip-load induced deflection of the roll shell and a deflection of the roll shell caused by said hydraulic fluid comprises:

an unpressurized space defined by the slide shoe, said unpressurized space being arranged in line with said nip, said unpressurized space permitting a free inward deflection of the roll shell.

2. A roll in a paper/board machine or a finishing machine, said roll comprising:
- a stationary axle;
- a cylindrical roll shell rotatably mounted on said stationary axle, said cylindrical roll shell being structured and arranged such that clearance space is defined between said stationary axle and an inner surface of the roll shell;
- a loading element operated by hydraulic fluid, said loading element including a slide shoe structured and arranged to place a load against said inner surface of the roll shell to thereby control the distribution of a nip pressure at a nip defined between said roll shell and a counter roll in said paper/board machine or finishing machine;
- wherein said loading element comprises first and second stabilizing chambers, each one of said stabilizing chambers being located on either side of said nip, and
- means for eliminating at least one of a nip-load induced deflection of the roll shell and a deflection of the roll shell caused by said hydraulic fluid;
- wherein said means for eliminating at least one of a nip-load induced deflection of the roll shell and a deflection of the roll shell caused by said hydraulic fluid comprises:
  - a high-pressure chamber, provided on a sliding surface of the slide shoe, said chamber being arranged substantially in line with the nip, said high-pressure chambered being structured and arranged to receive a high-pressure hydraulic medium.

3. A roll in a paper/board machine or a finishing machine, said roll comprising:
- a stationary axle;
- a cylindrical roll shell rotatable mounted on said stationary axle, said cylindrical roll shell being structured and arranged such that clearance space is defined between said stationary axle and an inner surface of the roll shell;
- a loading element operated by hydraulic fluid, said loading element including a slide shoe structured and arranged to place a load against said inner surface of the roll shell to thereby control the distribution of a nip pressure at a nip defined between said roll shell and a counter roll in said paper/board machine or finishing machine;
- wherein said loading element comprises first and second stabilizing chambers, each one of said stabilizing chambers being located on either side of said nip, and
- means for eliminating at least one of a nip-load induced deflection of the roll shell and a deflection of the roll shell caused by said hydraulic fluid;
- wherein said means capable of means for eliminating at least one of a nip-load induced deflection of the roll shell and a deflection of the roll shell caused by said hydraulic fluid comprises:
  - at least one void space provided in the loading element below the slide shoe.

4. A roll in a paperboard machine or a finishing machine, wherein said roll comprises:
- a stationary axle,
- a cylindrical roll shell mounted to said stationary axle such that a clearance is defined between the axle and an inner surface of the roll shell,
- at least one loading element operated by a pressurized hydraulic fluid and provided with a slide shoe which are loadable against the inner surface of the roll shell for controlling a distribution of a nip pressure in a nip formed between said roll and a counter roll (9),
- wherein the slide shoe defines an unpressurized space in line with the nip, allowing for a free inward deflection of the roll shell.

5. The roll according to claim 4, wherein the unpressurized space (18) comprises:
- a lengthwise slot, extending longitudinally along the said slot opening at both ends of said slide shoe into said clearance.

6. The roll according to claim 5, wherein the slide shoe comprises:
- stabilizing chambers provided circumferentially of the axle on either side of the nip, and wherein said slot is provided between said chambers in line with the nip.

7. A roll in a paper or board machine comprising:
- a stationary roll axle,
- a thin-walled roll shell mounted rotatably around the roll axle, said roll shell defining a nip with a counter roll in said paper or board machine;
- a loading shoe arranged in a loading chamber defined along the roll axle, said loading shoe being loadable by means of a hydraulic medium present in the loading chamber towards an inner surface of the shell for bringing a sliding surface of the shoe against an inner surface of the shell, wherein said shoe defines a high-pressure chamber substantially in line with the nip for eliminating a radially directed deformation in the shell caused by a nip force.

8. The roll according to claim 7, wherein the loading shoe further comprises:
- stabilizing chambers on either side of the high-pressure chamber in a peripheral direction of the shell, said stabilizing chambers being structured and arranged to receive a lubricating oil from the loading chamber.

9. The roll according to claim 7, wherein said loading shoe further comprises:
- at least two stabilizing chambers arranged in axial succession on either side of the high-pressure chamber.

10. The roll according to claim 7, wherein the high-pressure chamber is provided with a high-pressure inlet which is separate from the loading chamber.

11. The roll according to claim 8, wherein said high-pressure chamber is a wide neck area arranged between said stabilizing chambers.

12. The roll according to claim 11, wherein said neck area is provided with a inwardly directed chamfer for enhancing a hydrodynamic pressure increase.

13. The roll according to claim 11, wherein said neck area is structured and arranged to receive a feed of oil at a standard flow rate.

14. A hydrostatic loading shoe for a roll in a paper or board machine, said hydrostatic loading shoe comprising:
- a piston element having an outer crown arranged in a cylinder boring,
- a curvilinear slide shoe coupled to the outer crown of the piston element, said slide shoe having an upper surface for applying a load against an inner surface of a roll in a paper or board machine by means of a pressured medium introduced into the cylinder boring below the piston element, a chamber arranged below the upper surface of said slide shoe, said chamber not being subjected to a load caused by said pressure medium.

15. The loading shoe according to claim 14, wherein said chamber is arranged centrally below the slide shoe.

16. The loading shoe according to claim 14, wherein said slide shoe is adapted to bear against an inner surface of the roll shell of a deflection-compensated roll, and wherein said loading shoe comprises a piston element which is cup-shaped and includes a cavity opening towards said cylinder boring, wherein the void space below the slide shoe is defined by means of a shaped piece secured to a bottom of the piston-element cavity.

17. The loading shoe according to claim 16, wherein the shaped piece is a cup-like element having an annular rim, said cup-like element being secured by said rim to the bottom of the cavity in a sealed fashion.

18. The loading shoe according to claim 14, wherein said slide shoe (322) is structured and arranged to bear against a bearing journal provided on a roll axle for fitting said axle with a slide bearing.

19. The loading shoe as set forth in claim 18, further comprising:

a brace element arranged between the piston element and the slide shoe which is substantially equal in size to the slide shoe for reinforcing the slide shoe.

20. The loading shoe as set forth in claim 18, wherein the loading shoe is provided with a number of recesses and wherein the bearing surfaces comprise necks being shaped to achieve a desired deflection effect on the slide shoe.

* * * * *